United States Patent [19]

Dang et al.

[11] Patent Number: 5,136,012
[45] Date of Patent: Aug. 4, 1992

[54] DIHYDROXY-PENDANT RIGID-ROD BENZOBISAZOLE COPOLYMER

[75] Inventors: Thuy D. Dang, Dayton, Ohio; Hoe H. Chuah, Houston, Tex.; Loon S. Tan; Fred E. Arnold, both of Centerville, Ohio

[73] Assignee: United States of America as Represented by the Secretary of the Air Force, Washington, D.C.

[21] Appl. No.: 709,252

[22] Filed: Jun. 3, 1991

Related U.S. Application Data

[62] Division of Ser. No. 498,256, Mar. 23, 1990, Pat. No. 5,039,778.

[51] Int. Cl.⁵ .................... C08G 73/18; C08G 73/22
[52] U.S. Cl. .................... 528/183; 528/186; 528/193; 528/337; 528/342
[58] Field of Search ............... 528/183, 186, 193, 337, 528/342

[56] References Cited
U.S. PATENT DOCUMENTS
5,039,778  8/1991  Dang et al. .................... 528/183

Primary Examiner—Harold D. Anderson
Attorney, Agent, or Firm—Charles E. Bricker; Donald J. Singer

[57] ABSTRACT

There are provided novel rod-like heterocyclic aromatic copolymers having repeating groups of the formula:

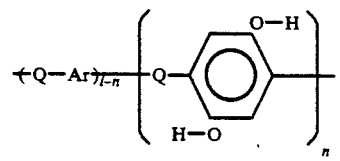

wherein n has a value of 0.01 to 0.50, wherein Ar is a para-oriented aromatic group and Q is an aromatic heterocyclic group of the formula:

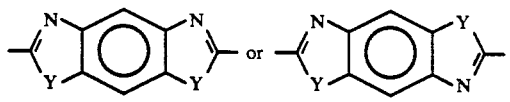

wherein Y is —S—, —O— or —NR—, wherein R is selected from the group consisting of —H, alkyl having 1 to 4 carbon atoms, and aromatic having 1 or 2 aromatic rings.

3 Claims, No Drawings

DIHYDROXY-PENDANT RIGID-ROD BENZOBISAZOLE COPOLYMER

RIGHTS OF THE GOVERNMENT

The invention described herein may be manufactured and used by or for the Government of the United States for all governmental purposes without the payment of any royalty.

This is a division of application Ser. No. 498,256, filed Mar. 23, 1990, now U.S. Pat. No. 5,039,778.

BACKGROUND OF THE INVENTION

This invention relates to rod-like heterocyclic aromatic polymers.

Considerable research has been directed toward the synthesis of extended chain or rod-like polymers. The unique ordering properties of these polymers has led to the preparation of extremely high modulus/high strength fibers.

It is an object of the present invention to provide novel rod-like heterocyclic aromatic polymers.

Other objects, aspects and advantages of the present invention will become apparent to those skilled in the art from a reading of the following detailed description of the invention.

SUMMARY OF THE INVENTION

In accordance with the present invention, there are provided novel rod-like heterocyclic aromatic copolymers having repeating groups of the formula:

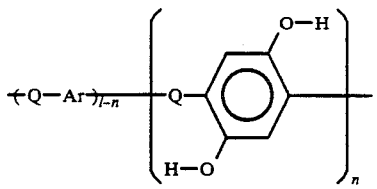

wherein n has a value of 0.01 to 0.50, wherein Ar is a para-oriented aromatic group and Q is an aromatic heterocyclic group of the formula:

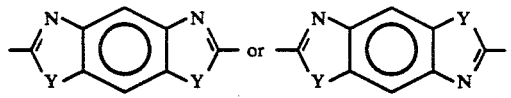

wherein Y is —S—, —O— or —NR—, wherein R is selected from the group consisting of —H, alkyl having 1 to 4 carbon atoms, and aromatic having 1 or 2 aromatic rings.

DESCRIPTION OF THE INVENTION

The copolymers are prepared by reacting an amino monomer of the formula:

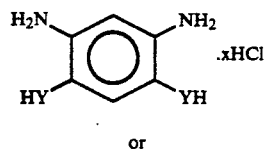

or

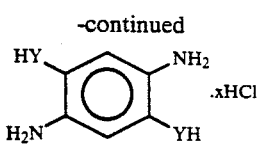

respectively, wherein Y is as defined above, wherein x is 2 or 4, depending on the number of amino groups in the molecule, with a para-ordered aromatic dicarboxylic acid and 2,5-dihydroxyterephthalic acid, in polyphosphoric acid (PPA).

The 2,5-dihydroxy terephthalic acid may be prepared from diethyl-1,4-cyclohexanedione-2,5-dicarboxylate according to the following reaction sequence:

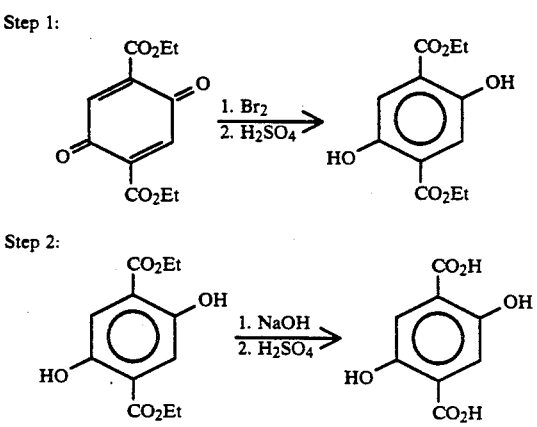

The para-ordered, aromatic dicarboxylic acid has the general formula HOOC-Ar-COOH, wherein Ar is 1,4-phenylene, a para-ordered ether or thio-ether, such as:

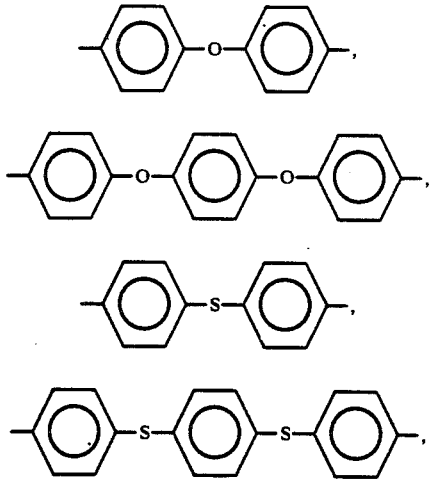

and the like.

In carrying out the polymerization, the amino monomer is initially dehydrochlorinated. This is accomplished by mixing the amino monomer, the para-ordered aromatic dicarboxylic acid and the 2,5-dihydroxyterephthalic acid with polyphosphoric acid and heating the mixture under an inert gas atmosphere at a temperature ranging from about 60° to 80° C. for a period of about 6 to 24 hours. In general, stoichiometric quantities of the monomers, i.e., amino compound to total diacid compounds, are used, although a slight excess of one of the monomers may be used. The ratio of 2,5-dihydroxyterephthalic acid to the second dicarboxylic acid can be in the approximate range of 1:99 to 1:1.

Following dehydrochlorination, the reaction mixture is heated at a temperature in the approximate range of 100° to 200° C. for a period of about 18 to 36 hours. In a preferred procedure, the reaction temperature is increased gradually during the reaction period, e.g., 130° C. for 3 hours, 150° C. for 3 hours, 170° C. for hours, 185° C. for 3 hours, and 195°-200° C. for 16 hours, or 160° C. for 16 hours and 190° C. for 16 hours, or the like. At the end of the reaction period, a small aliquot of the polymer is precipitated from solution into water, washed with water until acid-free and air dried. If the intrinsic viscosity of the polymer in methanesulfonic acid is not within the desired range of about 8 to 31 dl/g, polymerization is continued until an aliquot sample has the desired viscosity.

Intrinsic viscosity is determined by extrapolation of $\eta$ rel-l/c and ln $\eta$ rel/c to zero concentration in methanesulfonic acid at 30° C.

At the end of the reaction period the polymer is precipitated from solution by pouring the reaction mixture into a coagulation bath, such as water or methanol. If a bulk polymer is desired, the reaction mixture is poured directly into the coagulation bath, with or without stirring. The polymer may also be formed into fibers by extruding the polymer/PPA solution through a suitable spinnerette into the coagulation bath. The resulting fiber may be drawn and heat-treated following known procedures.

Alternatively, the amino monomer can be reacted with one of the dicarboxylic acids until the segment has a desired intrinsic viscosity, as determined by one or more aliquot samples. The reaction mixture, is cooled to about 30° to 60° C. and the second diacid monomer is added thereto. The resulting mixture is heated at a temperature in the approximate range of 100° to 200° C. for a period of about 12 to 36 hours. Aliquot samples may be collected, as described previously, to determine the intrinsic viscosity of the resulting polymer.

The following examples illustrate the invention:

EXAMPLE I

Diethyl-1,4-cyclohexanedione-2,5-dicarboxylate is reacted with bromine in cold sulfuric acid (0°-10° C.) to provide the aromatized product, diethyl-2,5-dihydroxyterephthalate. Hydrolysis of the diethyl-2,5-dihydroxyterephthalate by refluxing in aqueous sodium hydroxide followed by acidification with HCl provides 2,5-dihydroxyterephthalic acid. The diacid may be converted to the diacid halide by reaction with thionyl halide in diethyl ether.

EXAMPLE II

Poly(benzo(1,2-d:4,5-d')bisthiazole-2,6-diyl) (1,4-phenylene)$_{0.5}$(2,5-dihydroxy-p-phenylene)$_{0.5}$)

Into the bottom of a resin flask equipped with a high torque mechanical stirrer, nitrogen inlet/outlet, pressure regulator and a side opening for additions, was placed 4.90 g (20 mmol) of 2,5-diamino-1,4-benzenedithiol dihydrochloride, 1.66 g (10 mmol) of terephthalic acid, 1.98 g (10 mmol) of 2,5-dihydroxyterephthalic acid and 17.4 g of PPA (77% $P_2O_5$). The monomers were incorporated into the PPA by stirring. The resulting mixture was then dehydrochlorinated under reduced pressure (176 mm) while slowly heating the mixture to 80° C. The reaction temperature was maintained at 80° C. for 24 hours, then cooled to 60° C. 13.2 g of $P_2O_5$ was added to the mixture, thus raising the final polymer concentration to 15%. The mixture was heated under a positive nitrogen flow at 100° C. for 2 hr, 180° C. for 18 hr and 190° C. for 2 hr. The polymer was precipitated into water, collected by suction filtration, washed with ammonium hydroxide, washed with water and dried under reduced pressure (0.02 mm) at 110° C. An intrinsic viscosity of 30.8 dl/g was obtained in methanesulfonic acid at 30° C.

EXAMPLE III

Example II was repeated using the same monomers, quantities of monomers and processing conditions, with the exception that the maximum reaction temperature was 140° C. An intrinsic viscosity of 19.2 dl/g was obtained in methane sulfonic acid at 30° C.

EXAMPLE IV

Poly(benzo(1,2-d:4,5-d')bisthiazole-2,6-diyl (1,4-phenylene)$_{0.7}$(2,5-dihydroxy-p-phenylene)$_{0.3}$)

Into the bottom of a resin flask equipped with a high torque mechanical stirrer, nitrogen inlet/outlet, pressure regulator and a side opening for additions, was placed 4.41 g (18 mmol) of 2,5-diamino-1,4-benzenedithiol dihydrochloride, 2.09 g (12.6 mmol) of terephthalic acid, 1.07 g (5.4 mmol) of 2,5-dihydroxyterephthalic acid and 21.3 g of PPA (77% $P_2O_5$). The monomers were incorporated into the PPA by stirring. The resulting mixture was then dehydrochlorinated under reduced pressure (176 mm) while slowly heating the mixture to 80° C. The reaction temperature was maintained at 80° C. for 24 hours, then cooled to 60° C. 13.8 g of $P_2O_5$ was added to the mixture, thus raising the final polymer concentration to 15%. The mixture was heated under a positive nitrogen flow at 100° C. for 2 hr, 180° C. for 18 hr and 190° C. for 2 hr. The polymer was precipitated into water, collected by suction filtration, washed with ammonium hydroxide, washed with water and dried under reduced pressure (0.02 mm) at 110° C. An intrinsic viscosity of 25.9 dl/g was obtained in methanesulfonic acid at 30° C.

EXAMPLE V

Poly(benzo(1,2-d:4,5-d')bisthiazole-2,6-diyl) (1,4-phenylene)$_{0.9}$(2,5-dihydroxy-p-phenylene)$_{0.1}$)

Into the bottom of a resin flask equipped with a high torque mechanical stirrer, nitrogen inlet/outlet, pressure regulator and a side opening for additions, was placed 4.90 g (20 mmol) of 2,5-diamino-1,4-benzenedithiol dihydrochloride, 0.99 g (18 mmol) of terephthalic acid, 0.396 g (2 mmol) of 2,5-dihydroxyterephthalic acid and 23.3 g of PPA (77% $P_2O_5$). The monomers were incorporated into the PPA by stirring. The resulting mixture was then dehydrochlorinated under reduced pressure (176 mm) while slowly heating the mixture to 80° C. The reaction temperature was maintained at 80° C. for 24 hours, then cooled to 60° C. 22.3 g of $P_2O_5$ was added to the mixture, thus raising the final polymer concentration to 15%. The mixture was heated under a positive nitrogen flow at 100° C. for 2 hr, 180° C. for 18 hr and 190° C. for 2 hr. The polymer was precipitated into water, collected by suction filtration, washed with ammonium hydroxide, washed with water and dried under reduced pressure (0.02 mm) at 110° C. An intrinsic viscosity of 28 dl/g was obtained in methanesulfonic acid at 30° C.

EXAMPLE VI

The anisotropic reaction mixture of Example IV was spun into monofilament fibers using spin draw ratios (SDR) of 20 and 38 using a dry-jet wet spinning method with a 10 mil. diameter spinnerette and coagulated in distilled water. The air gap where the fiber was stretched was maintained at 8 inches. After neutralization with 3% NH$_4$OH and washing with water, the fibers were tension dried at 150° C., then heat treated in a tube oven under an inert nitrogen atmosphere at 435° C. with 30-sec residence time. The fiber drawn using a SDR of 20 had a modulus of 16 Msi, tensile of 120 Ksi, an elongation at break of 0.82% and a compressive strength of 16 Ksi. The fiber drawn using a SDR of 38 had a modulus of 39 Msi, tensile of 360 Ksi, an elongation at break of 0.95% and a compressive strength of 20 Ksi.

The high molecular weight ordered polymers of this invention exhibit excellent strength and modulus properties. These polymers are suitable substitutes for other inorganic or organic products.

Various modifications may be made to the invention as described without departing from the spirit of the invention or the scope of the appended claims.

We claim:

1. A heterocyclic aromatic copolymer having repeating groups of the formula:

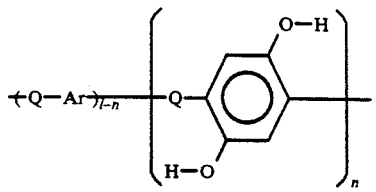

wherein n has a value of 0.01 to 0.50, wherein Ar is a para-oriented aromatic group and Q is an aromatic heterocyclic group of the formula:

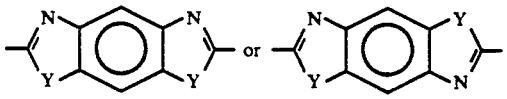

wherein Y is —O— or —NR—, wherein R is selected from the group consisting of —H, alkyl having 1 to 4 carbon atoms and aromatic having one or two aromatic rings.

2. The copolymer of claim 1 wherein Q is a benzobisoxazole group.

3. The copolymer of claim 1 wherein Q is a benzobisimidazole group.

* * * * *